Patented Nov. 20, 1934

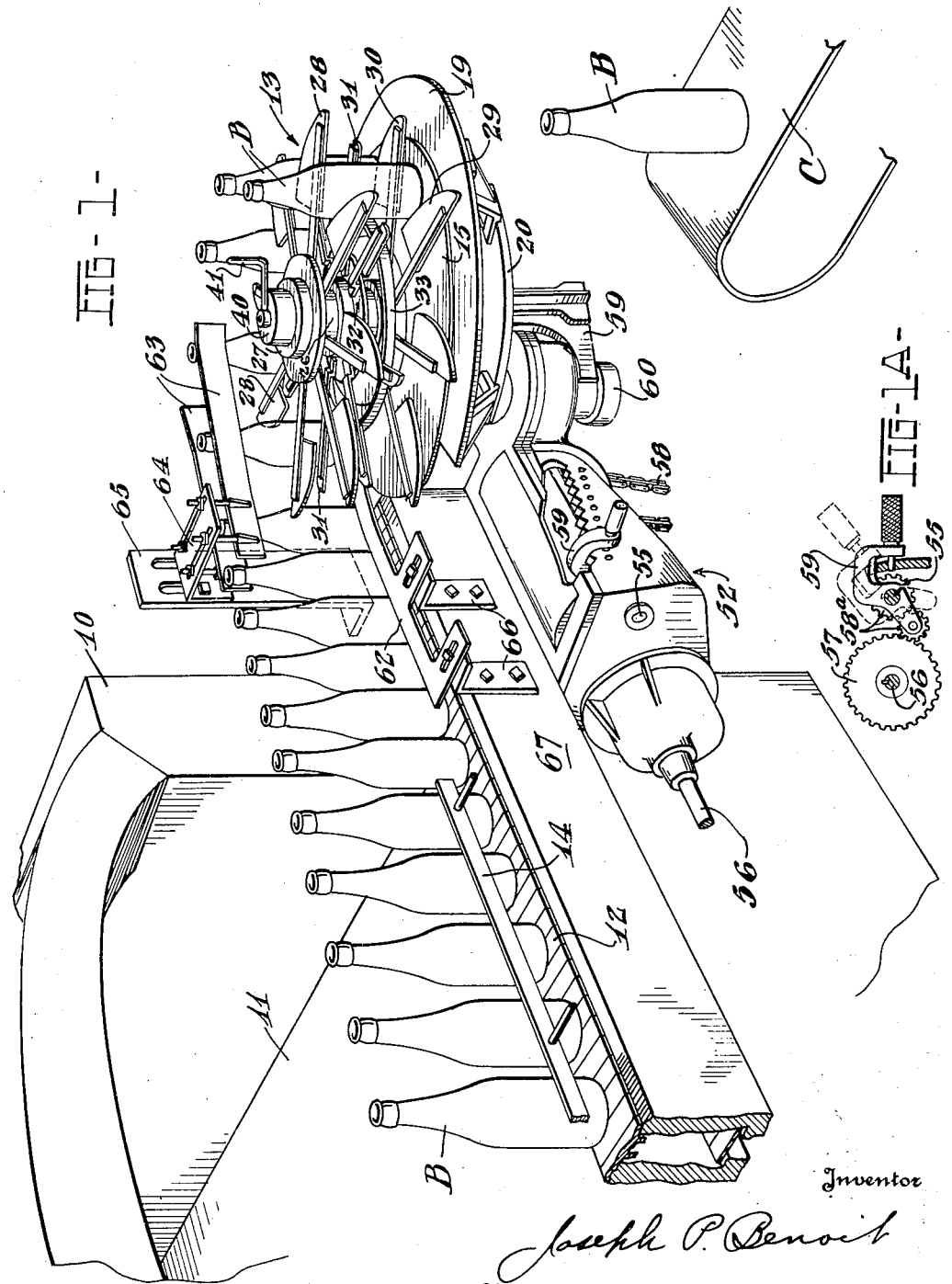

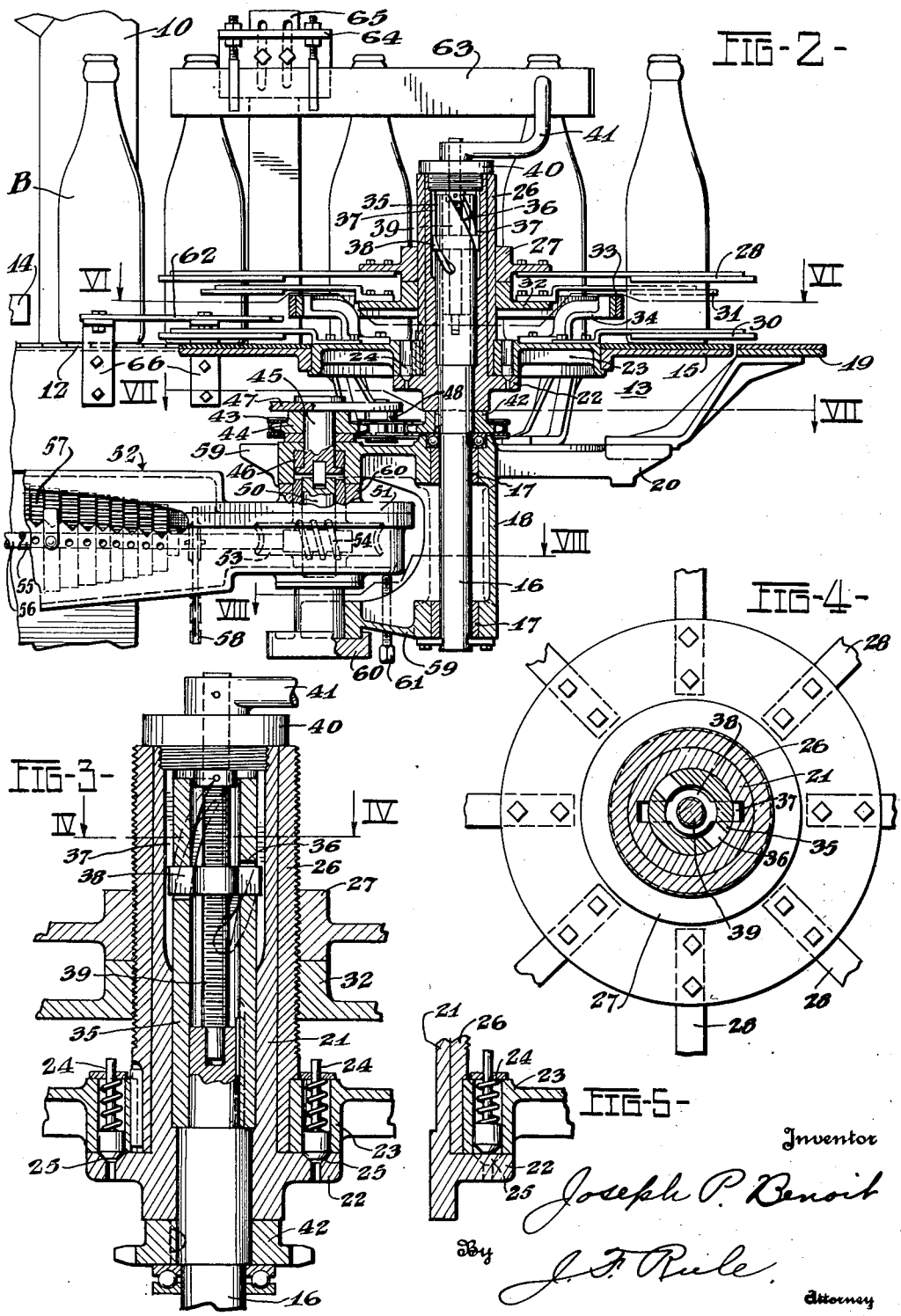

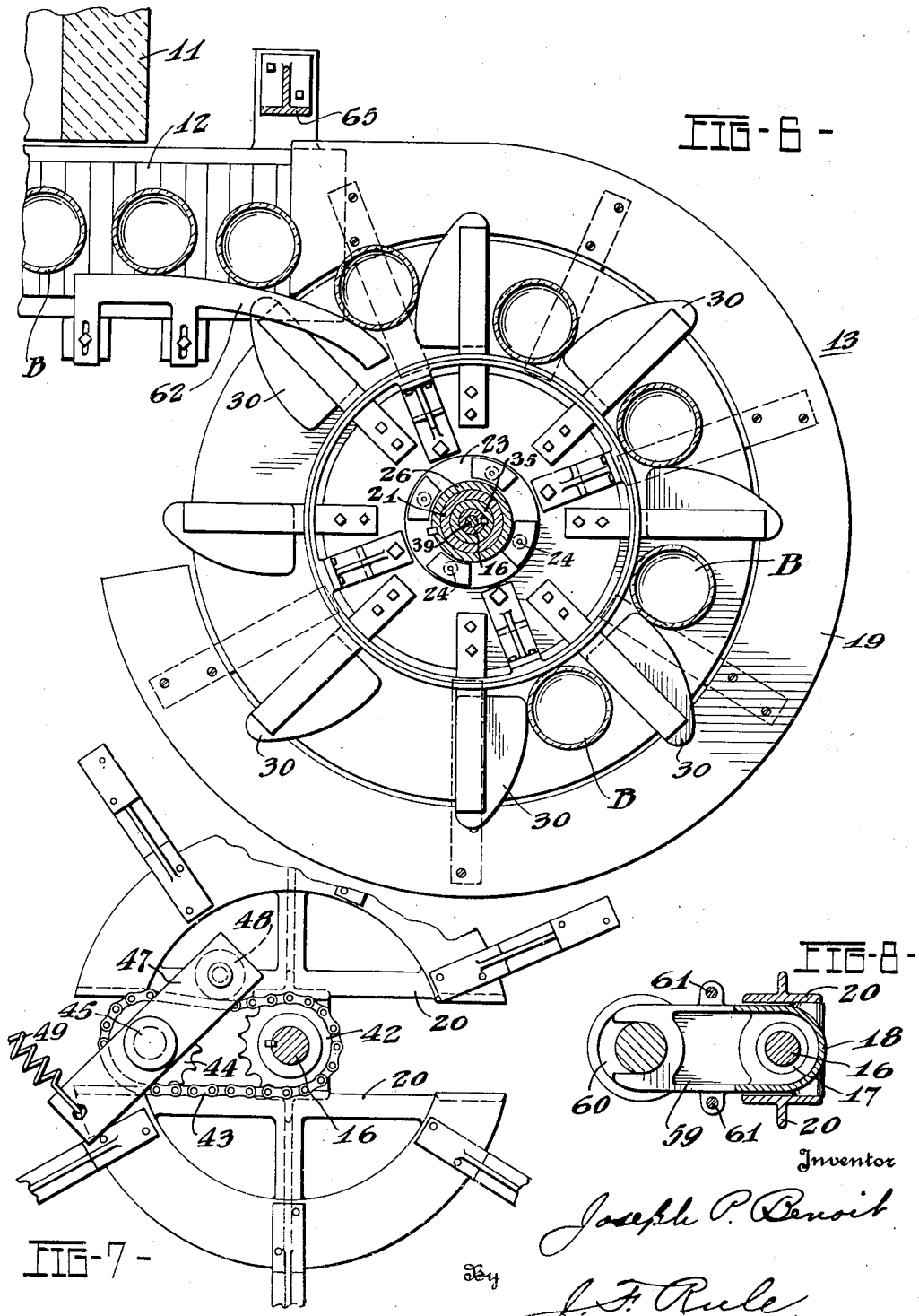
Nov. 20, 1934.　J. P. BENOIT　1,981,641
BOTTLE HANDLING APPARATUS
Filed March 16, 1933　3 Sheets-Sheet 3

1,981,641

UNITED STATES PATENT OFFICE 1,981,641

BOTTLE HANDLING APPARATUS

Joseph P. Benoit, Alton, Ill., assignor to Owens-Illinois Glass Company, a corporation of Ohio Application March 16, 1933, Serial No. 660,994

7 Claims. (Cl. 198—22)

The present invention relates to improvements in bottle handling apparatus and more particularly to means for placing bottles upright and in uniform spaced relation upon a cross conveyor at the receiving end of an annealing leer preparatory to transferring them to the leer.

In the commercial production of articles of glassware such, for example, as bottles and jars, the articles are removed from the forming machine, placed upon a machine conveyor and delivered in succession to a horizontal cross conveyor from which they are pushed into the receiving end of an annealing leer. Removal of the articles from the cross conveyor is obtained by means of a leer loader, one widely used form of which includes a horizontal pusher bar operating at regular time intervals to push groups of bottles from the cross conveyor onto a leer conveyor extending through the leer. It is desirable and, in fact, essential to satisfactory operation of the leer loader that the bottles be spaced apart uniformly on the cross conveyor and reach a position in front of the receiving opening of the leer in a definite timed relation to movement of the pusher bar constituting part of the leer loader. This latter feature is of importance for the obvious reason that if the bottles are not properly positioned upon the cross conveyor, the pusher bar instead of satisfactorily removing a group of bottles from the cross conveyor may so engage the last bottle of a group that it will be upset instead of pushed forward into the leer and in all probability cause upsetting and loss of a number of bottles.

An object of the present invention is to avoid the above objections and to this end provides a novel form of apparatus for uniformly spacing bottles and the like articles as they are automatically placed in succession upon one end of a cross conveyor at the receiving end of an annealing leer. From this cross conveyor the bottles or other articles are pushed in groups into the leer by a pusher bar forming part of a leer loader operating in timed relation with operation of the spacing apparatus.

Another object is the provision in an apparatus of the above character of means whereby the operations of the spacer may be advanced or retarded with respect to movement of the pusher bar of the loader to thereby insure proper engagement of the pusher bar with successive groups of bottles upon the cross conveyor.

Another object is the provision of a bottle spacing apparatus which is capable of adjustment in a fashion to permit handling of bottles or jars of various sizes and shapes. To this end the apparatus includes pushers and steadying fingers adjustable to compensate for variations in the diameter and height of the articles being handled.

Other objects will be in part apparent and in part pointed out hereinafter.

In the drawings:

Fig. 1 is a fragmentary perspective view illustrating the apparatus positioned at the receiving end of a glassware annealing leer.

Fig. 1—A is a detail view of the shifter forming part of the speed changing mechanism.

Fig. 2 is a vertical sectional elevational view of the spacing apparatus.

Fig. 3 is a fragmentary detail sectional view showing the means for advancing or retarding the operating positions of the pushers.

Fig. 4 is a sectional plan view taken substantially along the line IV—IV of Fig. 3.

Fig. 5 is a detail sectional view of a safety device involved in the construction of the spacing apparatus.

Fig. 6 is a sectional plan view taken substantially along the line VI—VI of Fig. 2.

Fig. 7 is a sectional view taken substantially along the line VII—VII of Fig. 2.

Fig. 8 is a sectional view taken substantially along the line VIII—VIII of Fig. 2.

In more or less general terms the invention consists of a horizontal rotary table and an annular series of bottle pushers and steadying fingers disposed above the table and rotating therewith, all of said elements arranged at one end of a horizontal cross conveyor disposed at the receiving end of a glassware annealing leer. Bottles or like articles placed upon the table are spaced apart uniformly by the pushers and steadying fingers and at a predetermined point transferred to the cross conveyor by means of deflectors which cooperate with the pushers in the transferring operation. Both the pushers and steadying fingers are adjustable vertically in order to compensate for differences in the height of bottles or jars being handled, such adjustment being necessary in order to effect such engagement between these elements and the bottles that upsetting of the bottles will be avoided. The steadying fingers are adjustable horizontally about their axis of rotation to compensate for variations in the diameter and/or cross sectional shape of the articles being handled.

In the drawings, the bottle spacing apparatus is shown in conjunction with a conventional form of annealing leer 10 through which a horizontal leer conveyor 11 extends for the purpose of transporting bottles or the like articles therethrough. A horizontal cross conveyor 12 extends transversely of the receiving end of said leer, one end of said cross conveyor terminating in proximity to the spacing apparatus 13. Bottles B which are brought in succession by the cross conveyor 12 to a position in front of the leer, are pushed in groups onto the leer conveyor 11 by means of a pusher bar 14 constituting part of a leer loader (not shown) which may be of any conventional or preferred type, such, for example, as that shown in an allowed application, Serial Number 520,972, filed March 7, 1931, which matured in Patent No. 1,906,605, May 2, 1933, in the name of Oliver C. K. Hutchinson. This pusher bar is operated at regular time intervals as may be determined by the speed of travel of the cross conveyor 12.

The spacer 13 includes a rotary horizontal table 15 mounted for rotation with a vertical shaft 16 or column which is journaled in a pair of vertically spaced bearings 17, said bearings provided in a bracket 18. A stationary table 19 partially encircles the rotary table 15 and has one end overlying the receiving end of the cross conveyor 12 so that it will support bottles or the like articles during transfer thereof from the rotary table to said conveyor. Arms 20 carried by the bracket 18 support the stationary table 19. A sleeve 21 is telescoped over the shaft 16 above the upper bearings 17 and provided near its lower end with a radial horizontal flange 22 upon which the rotary table 15 rests. A hub 23 carrying the table is provided with a plurality of spring detents 24 designed for engagement with upwardly facing recesses 25 in said flange 22. These detents which provide separable driving connection between the sleeve 21 and table 15, also function as a safety device, as is obvious. An externally threaded sleeve 26 is telescoped over the sleeve 21 and at its lower end is keyed to the hub 23 of said table 15. A hub 27 is threaded upon said sleeve 26 and carries an annular series of pushers 28 or pushing fingers, the forward curved margins 29 of which are adapted for engagement with bottles or the like articles being handled. These pushers 28 cooperate with an annular series of pushers 30 or pushing fingers carried by the table 15, the pushers 28 being vertically aligned and adjustable as to height.

For the purpose of insuring effective support of the bottles being handled by the spacing apparatus, steadying fingers 31 are arranged in a plane between the vertically spaced series of pushers 28 and 30, said steadying fingers extending radially outward from a hub 32 which is threaded upon the sleeve 26. Directly beneath the series of steadying fingers, a circular guide rail 33 is provided to limit inward movement of the articles between the pushers and steadying fingers. This guide rail is connected by arms 34 to the hub 23 of said table 15.

For the purpose of advancing or retarding the table 15 and said pushers and steadying fingers relative to the cross conveyor 12 as may be required from time to time in order to insure arrival of the bottles in front of the leer at proper intervals, the following construction is employed. A sleeve extension 35 is provided at the upper end of and keyed to the shaft 16 and formed with a pair of opposed spiral slots 36 which are at all times partially in register with a pair of opposed vertical channels 37 or ways, formed lengthwise of the sleeve 21. A slide block 38 threaded upon an adjusting screw 39 extending axially upward from the shaft 16, has portions projecting through the spiral slots 36 and into said channels or ways. The adjusting screw extends through a cap 40 and carries a crank 41, the latter serving as means through which the screw may be rotated for the purpose of moving the block 38 vertically. It is evident that by moving the block 38 vertically, the sleeves 21 and 26 will be rotated relative to the sleeve extension 35 with the result that said table 15 and the fingers or pushers may be advanced or retarded the necessary degree.

Continuous rotation of the shaft 16 for the purpose of moving the table 15 and fingers is obtained by an electric motor (not shown) operating through power transmitting devices including a sprocket 42 fixed to the shaft 16 just above the upper bracket 17, said sprocket connected through a sprocket chain 43 to a sprocket 44 mounted at the upper end of a short shaft 45. The shaft is journaled in a vertical bearing 46 and carries an arm 47 forming part of a chain tightener and including an idler roller 48 and spring 49, the latter holding the arm in such position that the roller constantly applies tension to the sprocket chain 43. This short shaft 45 has separable driving connection to a shaft 50 extending upwardly from a gear housing 51 at one end of a speed change mechanism 52. A worm gear 53 on the shaft 50 runs in mesh with a worm 54 at one end of a horizontal shaft 55. A shaft 56 arranged alongside of the shaft 55 carries a series of gears 57 graduated in size toward one end of the shaft. Through means including a sprocket chain 58, the shaft 56 has driving connection to the motor (not shown). Two meshing pinions 58ª (Fig. 1—A) carried by a shifter 59, which in turn is slidable along the shaft 55, provides means for transmitting power from any of the gears 57 to said shaft 55 and thence to the spacing table 13. By adjusting the position of the pinions 58ª, the shaft 55 and, therefore, the spacing apparatus 13, may be driven at any desired speed with respect to the cross conveyor 12.

The spacing apparatus may be removed as a unit from the assembly with ease. The construction permitting this may be substantially as follows. Arms 59 extending horizontally from the bracket 18 rest upon and have interlocking engagement with extensions 60 on the housing for the worm and worm gear. A lock screw 61 normally secures the units assembled. Separation of units is effected by loosening of the lock screw 61 and lifting the spacing apparatus sufficiently to disengage the arms 59 from the extensions 60.

Bottles or the like articles being transferred from the spacing apparatus to the receiving end of the cross conveyor 12, have their lower margins engaged by an adjustable curved deflector 62 and their upper portions guided by a pair of deflector arms 63 or bars, the latter disposed above the receiving end of the cross conveyor and adjustably suspended from the bracket 64 on a post 65. The bracket is adjustable up and down on the post and the deflector arms adjustable relative to each other and as a unit on said bracket. Thus bottles or other articles of various heights and shapes may be handled with safety. The deflector 62 designed to engage the lower portions of the articles is carried by a pair of brackets 66 mounted upon the flange 67 upon which the cross conveyor 12 is supported.

In operation, bottles or like articles discharged from a forming machine (not shown)

are brought by means of a machine conveyor C to a point in proximity to the receiving end of a leer. The operator then places the bottles upon the stationary table 19 and periodically pushes them into positions between the vertically spaced pushers 28 and 30 and the corresponding steadying fingers 31. Rotation of these pushers, fingers and the sleeve 26 with which they are rigidly connected during operation, together with the rotary table 15 carries the bottles to the point at which they are transferred to the cross conveyor 12. The deflector arms 62 or bars, cooperate with the curved pushers 28 and 30 in placing the bottles upright and in uniform spaced relation upon the cross conveyor. A change in the height of the bottles being handled may necessitate vertical adjustment of the pushers 28 and fingers 31 in order that the bottles will be engaged thereby at the proper point and not upset at the time they are pushed upon the conveyor. To this end the pushers 28 and fingers 31 are adjusted as brought out heretofore. The steadying fingers 31 may be adjusted vertically, if necessary, and, moreover, as pointed out above, are adjustable circumferentially of the apparatus to compensate for variations in the diameter of the articles being handled.

As has been brought out heretofore, the pusher bar 14 of the leer loader is operated at regular time intervals to push groups of bottles from the cross conveyor to the leer. A change in the diameter of the bottles being produced necessitates an increase or decrease in the speed of travel of the cross conveyor in order that the bottles will be properly spaced apart in the leer and at the same time insure utilization of the full capacity thereof. In accomplishing this the speed of the motor (not shown) will be increased or decreased as circumstances require with the result that the speed of the cross conveyor which is driven by said motor through the shaft 56 and other mechanism (not shown) will be properly varied.

Modifications may be resorted to within the spirit and scope of the appended claims.

What I claim is:

1. In combination, a horizontal cross conveyor from which bottles are adapted to be transferred in groups to a glassware annealing leer, a bottle spacing apparatus at one end of the cross conveyor including a circular horizontal table disposed in the same plane with the ware supporting reach of the cross conveyor and rotatable about a vertical axis, two superposed annular series of bottle pushing fingers arranged above and rotatable with said table, means in effect forming a continuation of the table over which bottles are adapted to be pushed from said table to the cross conveyor, means cooperating with said pushing fingers in pushing the bottles from the table to the conveyor, and a series of steadying fingers disposed between the two annular series of pushing fingers, said steadying fingers individual to the pairs of superposed pushing fingers and disposed in advance thereof for contact with the forward sides of bottles resting upon the table.

2. In combination, a horizontal cross conveyor from which bottles are adapted to be transferred in groups to a glassware annealing leer, a bottle spacing apparatus at one end of the cross conveyor including a circular horizontal table disposed in the same plane with the ware supporting reach of the cross conveyor and rotatable about a vertical axis, two superposed annular series of bottle pushing fingers arranged above and rotatable with said table, means in effect forming a continuation of the table over which bottles are adapted to be pushed from said table to the cross conveyor, means cooperating with said pushing fingers in pushing the bottles from the table to the conveyor, a series of steadying fingers disposed between the two annular series of pushing fingers, said steadying fingers individual to the pairs of superposed pushing fingers and disposed in advance thereof for contact with the forward sides of bottles resting upon the table, and means whereby the steadying fingers may be moved vertically and caused to engage bottles at different vertically spaced points.

3. A bottle spacing apparatus comprising a continuously rotating vertical column, a radial flange at the lower end thereof, a sleeve telescoped over the column and resting upon the flange, spring means separably connecting the sleeve and flange and providing for relative rotary movement between the sleeve and column under abnormal conditions, a bottle supporting table at the lower end of the sleeve, and bottle pushing fingers extending radially outward from said sleeve in vertical spaced relation to said table.

4. A bottle spacing apparatus comprising a continuously rotating vertical column, a radial flange at the lower end thereof, a sleeve telescoped over the column and resting upon the flange, spring means separably connecting the sleeve and flange and providing for relative rotary movement between the sleeve and column under abnormal conditions, a bottle supporting table at the lower end of the sleeve, collars threaded upon the sleeve above said table and adjustable lengthwise of the former, bottle pushing fingers extending radially outward from one of said collars, and steadying fingers extending radially from the other collar in advance of the pushing fingers.

5. A bottle spacing apparatus comprising a continuously rotating vertical column, a radial flange at the lower end thereof, a sleeve telescoped over the column and resting upon the flange, spring means separably connecting the sleeve and flange and providing for relative rotary movement between the sleeve and column under abnormal conditions, a bottle supporting table at the lower end of the sleeve, bottle pushing fingers extending radially outward from said sleeve in vertical spaced relation to said table, a drive shaft operatively connected to said vertical column, a horizontal conveyor to which bottles are transferred from the spacing apparatus, and means including speed changing mechanism for establishing driving connection between said shaft and conveyor, said speed changing mechanism operable to adjust the relative speeds of movement of said fingers and conveyor.

6. A bottle spacing apparatus comprising a continuously rotating vertical column, a radial flange at the lower end thereof, a sleeve telescoped over the column and resting upon the flange, spring means separably connecting the sleeve and flange and providing for relative rotary movement between the sleeve and column under abnormal conditions, a bottle supporting table at the lower end of the sleeve, bottle pushing fingers extending radially outward from said sleeve in vertical spaced relation to said table, a drive shaft operatively connected to said vertical column, a horizontal conveyor to which bottles are transferred from the spacing apparatus, and manually operable means for effecting relative rotary movement between said driving shaft and vertical column to thereby advance or retard the operating positions of the fingers relative to the conveyor.

7. A bottle spacing apparatus comprising a continuously rotating vertical column, a horizontal table encircling the column, means including spring detents separably connecting the table and column whereby operative connection between the column and table may be broken under abnormal conditions, an annular series of pushers supported on and extending radially outward from said column above the table, means for adjusting the fingers vertically relative to the table including a sleeve telescoped over the column and connected to the table, and a hub supporting said pushers and threaded upon the sleeve.

JOSEPH P. BENOIT.